US007689722B1

(12) United States Patent
Timms et al.

(10) Patent No.: US 7,689,722 B1
(45) Date of Patent: Mar. 30, 2010

(54) METHODS AND APPARATUS FOR VIRTUAL PRIVATE NETWORK FAULT TOLERANCE

(75) Inventors: Natalie Timms, Seattle, WA (US); Scott Fanning, Sunnyvale, CA (US); Ian Herbert Wilson, Midlothian (GB)

(73) Assignee: Cisco Technology, Inc., San Jose, CA (US)

( * ) Notice: Subject to any disclaimer, the term of this patent is extended or adjusted under 35 U.S.C. 154(b) by 1475 days.

(21) Appl. No.: 10/268,344

(22) Filed: Oct. 7, 2002

(51) Int. Cl.
G06F 15/16 (2006.01)
(52) U.S. Cl. .................. 709/249; 709/250; 709/203; 709/218; 709/219; 713/166; 713/171; 718/1; 718/100
(58) Field of Classification Search .......... 709/249, 709/250, 203, 207, 218, 219; 713/166, 171; 718/1, 100, 105
See application file for complete search history.

(56) References Cited

U.S. PATENT DOCUMENTS

| 6,055,575 | A | * | 4/2000 | Paulsen et al. ............. 709/229 |
| 6,079,020 | A | * | 6/2000 | Liu .......................... 726/15 |
| 2002/0124090 | A1 | * | 9/2002 | Poier et al. ................ 709/228 |
| 2002/0133534 | A1 | * | 9/2002 | Forslow .................... 709/200 |
| 2002/0156867 | A1 | * | 10/2002 | Iwami ...................... 709/218 |
| 2003/0191937 | A1 | * | 10/2003 | Balissat et al. ............ 713/163 |
| 2004/0114595 | A1 | * | 6/2004 | Doukai ..................... 370/389 |
| 2005/0138204 | A1 | * | 6/2005 | Iyer et al. ................. 709/242 |

OTHER PUBLICATIONS

T. Li, et al., "Cisco Hot Standby Router Protocol (HSRP)," The Internet Society, Mar. 1998, pp. 1-17.
S. Knight, et al., "Virtual Router Redundancy Protocol (VRRP)," The Internet Society, Apr. 1998, pp. 1-27.

* cited by examiner

*Primary Examiner*—Saleh Najjar
*Assistant Examiner*—Thuong T Nguyen
(74) *Attorney, Agent, or Firm*—Weaver Austin Villeneuve & Sampson LLP (57) ABSTRACT

Methods and apparatus are provided for enhancing security and fault tolerance for VPN gateways connecting clients in a public network with entities in a private network. According to various embodiments, primary and standby VPN gateways serving the same private network are configured with the same virtual IP address to allow public network clients the ability to efficiently switchover to a standby VPN gateway upon failure of the primary VPN gateway. Cryptography operations are executed using the virtual IP address. Routes can also be injected into the private network to enhance failover efficiency.

27 Claims, 7 Drawing Sheets

| Gateway List | |
|---|---|
| Gateway | Private Network |
| 192.1.14.8 | 221 |
| 12.23.247.6 | 221 |
| 112.64.4.7 | 221 |
| 112.63.14.9 | 223 |
| 112.63.4.7 | 223 |

| Security Association Information | | | | |
|---|---|---|---|---|
| Node Address | Local Address | Port | Protocol | Key Information |
| Node 511 | Virtual IP Address 521 | Port Number 531 | Protocol Version 541 | Key 551 |
| Node 513 | Virtual IP Address 521 | Port Number 533 | Protocol Version 543 | Key 553 |
| Node 515 | Virtual IP Address 521 | Port Number 535 | Protocol Version 545 | Key 555 |

METHODS AND APPARATUS FOR VIRTUAL PRIVATE NETWORK FAULT TOLERANCE

BACKGROUND OF THE INVENTION

1. Field of Invention

The present invention relates generally to virtual private networks. More particularly, the present invention relates to providing security and fault tolerance for VPN gateways providing clients in a public network access to entities in a private network.

2. Description of the Related Art

Conventional virtual private networks deployed on a public network infrastructure provide the same security, management, quality of service policies, and benefits provided in private networks. Typical applications of virtual private networks (VPN) allow remote network nodes such as telecommuters, suppliers, partners, or distant offices access to a private network such as a company network through a VPN gateway. Many VPN applications use IPsec to provide encryption and authentication of messages between a client and a VPN gateway. The secure connection between a client and a VPN gateway is often referred to as a VPN tunnel. In most cases, a client accessing a private network through a VPN tunnel can enjoy the same privileges and access capabilities as a client within the private network.

However, conventional virtual private networks have very limited failover capabilities. A VPN client is typically provided with a gateway list. If one particular VPN gateway is determined to be inaccessible, another VPN gateway is selected from the VPN gateway list. However, this process is often slow and inefficient. Consequently, it is desirable to provide improved solutions for fault tolerance for VPN gateways.

SUMMARY OF THE INVENTION

Methods and apparatus are provided for enhancing security and fault tolerance for VPN gateways connecting clients in a public network with entities in a private network. According to various embodiments, primary and standby VPN gateways serving the same private network are configured with the same virtual IP address to allow public network clients the ability to efficiently switchover to a standby VPN gateway upon failure of the primary VPN gateway. Cryptography operations are executed using the virtual IP address. Routes can also be injected into the private network to enhance failover efficiency.

In one embodiment, a method for providing redundancy at a virtual private network gateway is provided. One of a plurality of VPN gateways is identified as a primary VPN gateway. The plurality of VPN gateways couple a private network to a public network. The primary VPN gateway is set as the active VPN gateway. A virtual IP address is assigned to the plurality of VPN gateways. A client associated with the public network communicates with an entity on the private network by using the assigned virtual IP address. The virtual IP address is used during a key exchange sequence with the client associated with the public network before allowing a client associated with the public network to access an entity on the private network.

In another embodiment, a VPN gateway is provided. The VPN gateway includes memory, a processor, a public network interface, and a private network interface. The public network interface is coupled to the processor. The public network interface is configured to provide a virtual IP address to a client associated with a public network during a key exchange sequence. The virtual IP address is assigned to a plurality of VPN gateways coupling a private network to the public network. A private network interface is configured to provide the virtual IP address to an entity associated with the private network.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the Hot Standby Router Protocol as well as security for key exchange sequences. However, it should be noted that the techniques of the present invention are applicable to a variety of different protocols and networks. Further, the solutions afforded by the invention are equally applicable to variations in redundancy protocols and authentication and encryption sequences. According to various embodiments, the techniques of the present invention allow for the implementation of redundancy for private network gateways connected to client entities on a public network accessing a private network using keys or a certificate trust model shared with the virtual private network (VPN) gateways.

Figure 1:
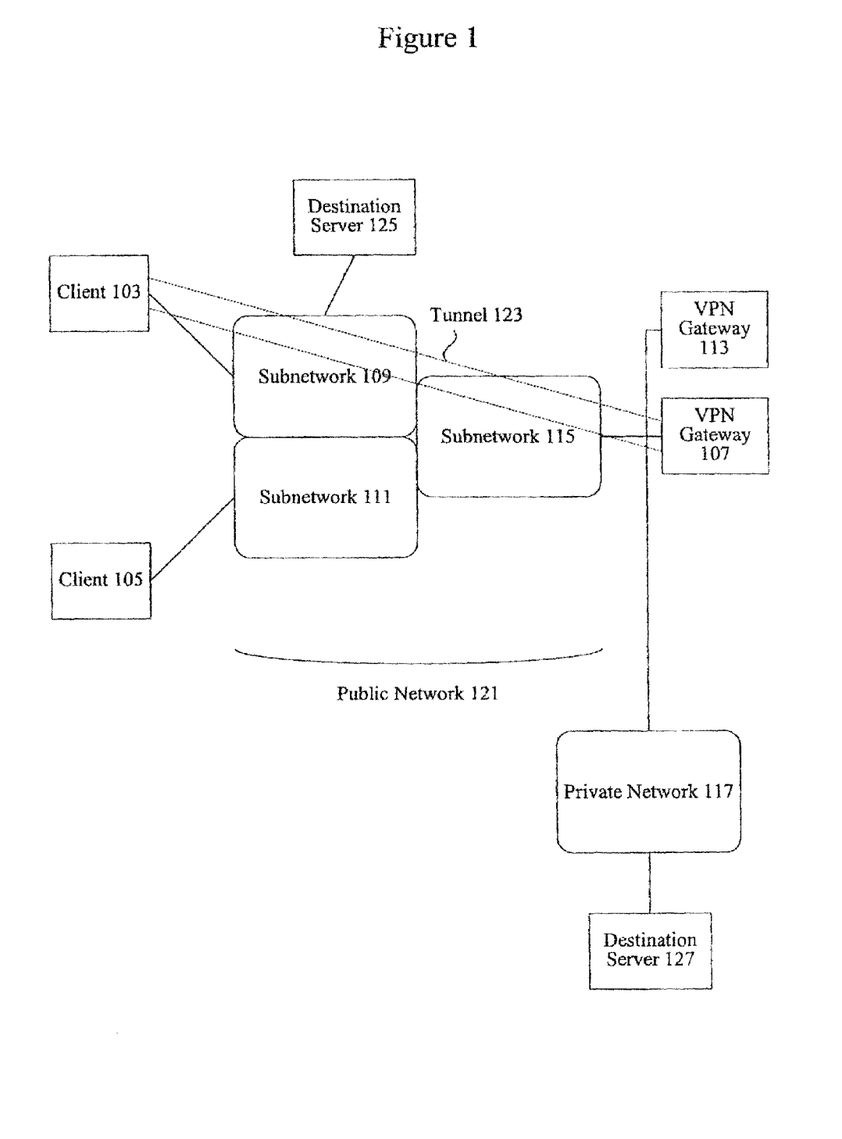
FIG. 1 is a diagrammatic representation of a system that can use the techniques of the present invention.

Typical virtual private network gateway implementations using security protocols, such as Internet Protocol Security (IPsec), have very limited failover capabilities. FIG. 1 is a diagrammatic representation showing a system having a typical virtual private network gateway implementation.

FIG. 1 is a diagrammatic representation of a system that can use the techniques of the present invention. The subnetworks 109, 111, and 115 are part of a public network 121. The public network 121 can be connected to a variety of private networks as well as other public networks through different network nodes. For example, the public network 121 is connected to private network 117 through a VPN gateway 107. A destination server 127 is part of the private network 117. The public network 121 is also connected to a destination server 125 as well as clients 103 and 105.

In one example, a client 103 is a laptop attempting to access a company private network 117 through public network 121 and VPN gateway 107. A client 103 determines the address of the VPN gateway the allows access to the private network 117 typically by using a gateway list. One or more VPN gateways can serve a particular private network. In one example, VPN gateway 107 is the primary gateway and VPN gateway 113 is the secondary gateway. In some instances, multiple VPN gateways are provided to allow load balancing of clients and some fault tolerance. A client selects one or more VPN gateways by using a gateway list and begins to establish a VPN tunnel 123. If one particular gateway is not accessible, another gateway from the gateway list is selected.

To acquire access to destination server 127 in private network 117, a client makes an access request to VPN gateway 107. The client 103 provides information such as its IP address, its user name, and its password. According to various embodiments, the techniques of the present invention work with any handshake mechanism, such as a key exchange, using a physical address associated with a gateway.

The use of the gateway's IP address, encryption, and authentication allow the client 103 to create a VPN tunnel 123 to VPN gateway 107. It should be noted that VPN tunnel 123 is an abstraction depicting the secure traffic flow between client 103 and VPN gateway 107. VPN tunnels will be described in more detail below. Even though the abstraction provides for a VPN tunnel, messages flowing between client 103 and VPN gateway 107 may actually flow through a variety of different network nodes in public network 121. According to various embodiments, nodes on a private network 117 are accessed through VPN tunnel 123 while nodes on public network 121 are accessed directly. According to other embodiments, both nodes on a private network 117 and nodes on a public network 121 are accessed through VPN tunnel 123.

Typically, two VPN gateways, the primary 107 and secondary 113, are made available to a client entity 103 on the public network 121. A VPN tunnel 123, along with security associations such as Internet Key Exchange (IKE) or IPsec security associations are established by a client entity on a public network with the primary gateway 107. The secondary gateway is used in the event of failure of the primary gateway. Failure of the primary gateway is usually detected when the entity 103 on the public network 121 fails to receive keepalive or heartbeat messages from the primary gateway 107. However, the determination of failure of the primary gateway is typically inefficient from the standpoint of a client entity on a public network. After a timeout period, the remote entity recognizes that the primary gateway 107 may not longer be accessible. The client entity 103 then proceeds to reestablish connectivity to the private network by identifying a secondary gateway using a gateway list. If a keepalive mechanism is not available, detection of failover may take some time.

Figure 2:
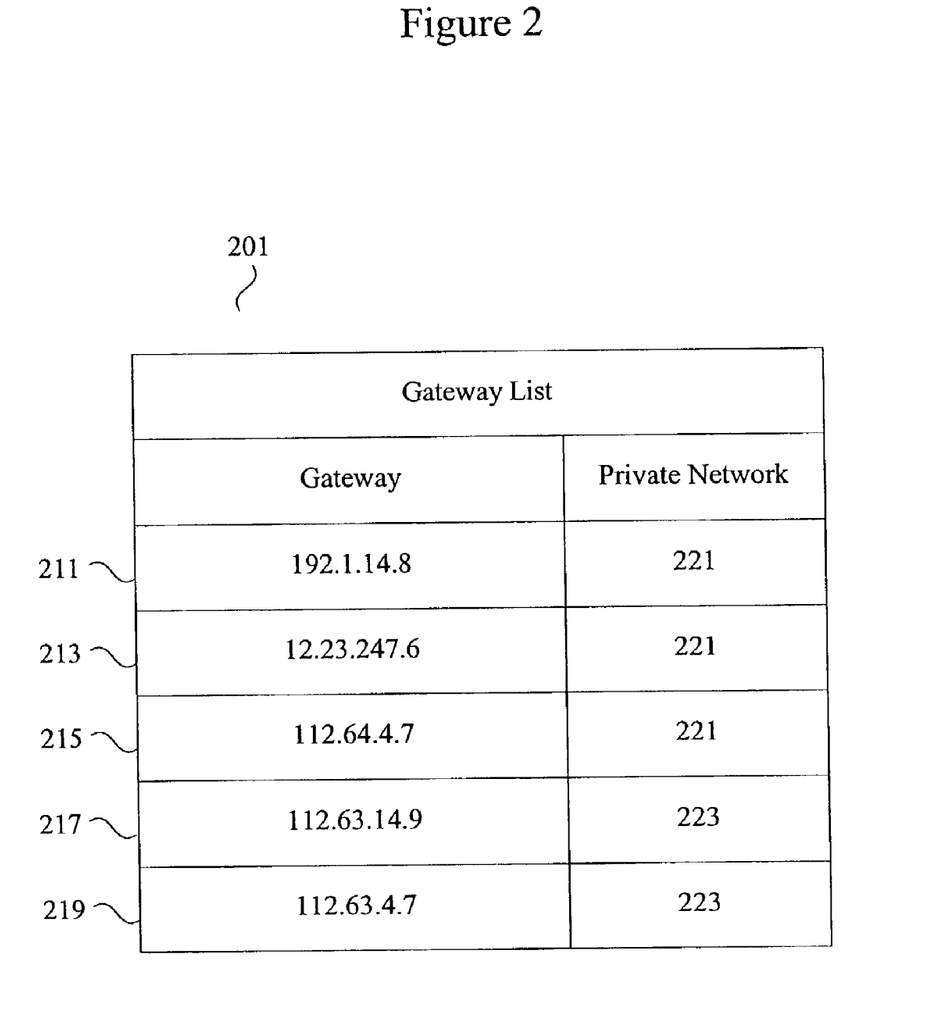
FIG. 2 is a diagrammatic representation of a gateway list that a client uses to access a private network.

FIG. 2 is a diagrammatic representation showing a gateway list. Gateway list 201 includes a plurality of gateways 211-219 for accessing private networks 221-223. A gateway list may be dynamically or statically configured on a client. The client gateway list 201 identifies gateways 211, 213, and 215 for accessing a private network 221. It should be noted that actual entities on the private network may also be included on the gateway list 201. A client typically attempts to access the private network 221 by first accessing a gateway 211. After a lengthy and often inefficient determination that gateway 211 is not reachable or is no longer reachable, the client then attempts to access another gateway on the gateway list 201 such as gateway 213. The client would then have to establish a VPN tunnel to the new gateway 213, typically using IPSec.

IPSec specifies that before a VPN tunnel is established, a security association (SA) is negotiated between a client and a VPN gateway. One of the problems with IPSec by itself is the lack of a key-management system. Key exchange protocols such as the Internet Key Exchange Protocol (IKE) can be used to augment IPSec to allow for the dynamic establishment of SA information and session key information. In typical implementations, IKE must be used. The IP address the clients connect to is the tunnel endpoint for IKE purposes.

Figure 3:
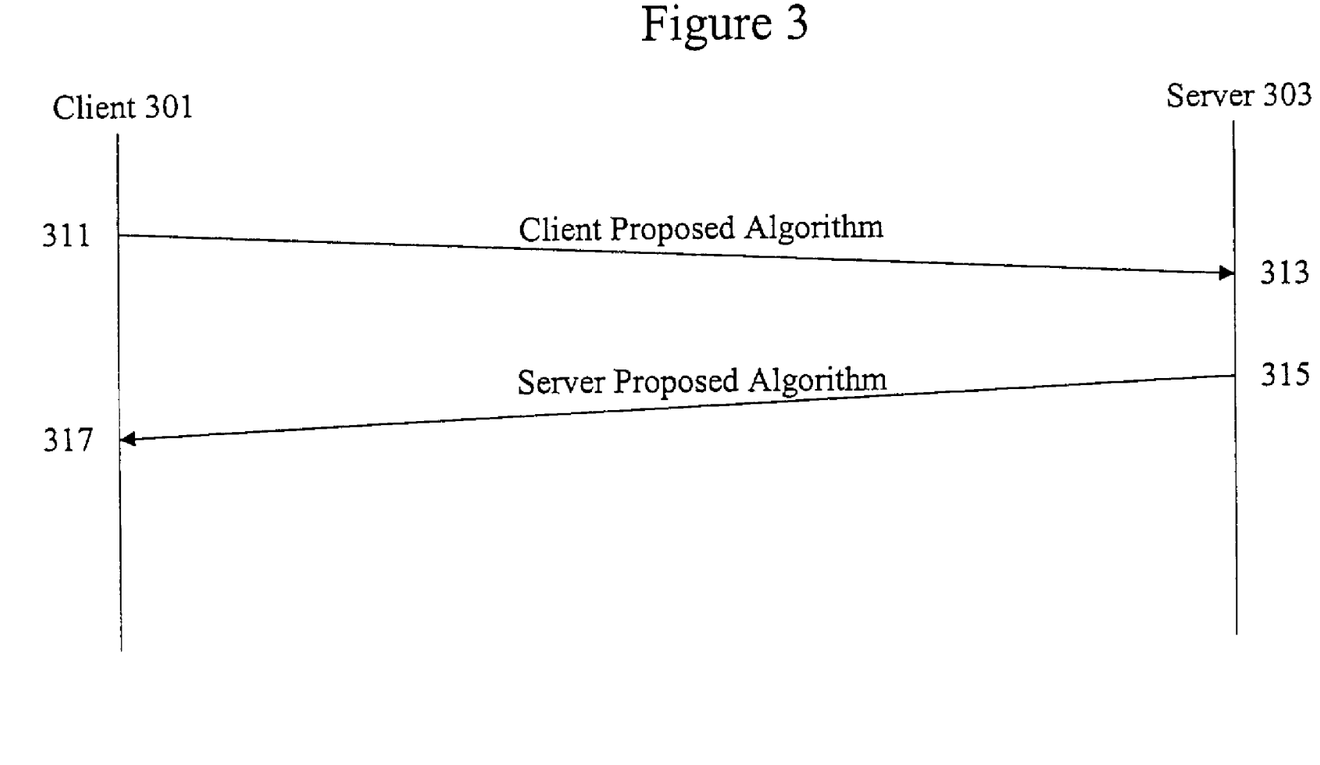
FIG. 3 is a exchange diagram showing a typical key exchange sequence.

FIG. 3 is an exchange diagram showing one example of a key exchange sequence. It should be noted that a variety of key exchange sequences can be used. At 311, the client 301 transmits a message with a security enable parameter to a VPN gateway 303. In one embodiment, the authentication message contains a client identifier and a protection suite that allows the receiver to select a comparable encryption and authentication mechanism out of a possible set of mechanisms. VPN gateway 303 may or may not already have information associated with the client. The VPN gateway 303 identifies the security enable parameter along with any client proposed algorithms and proposes its selection of algorithms for encryption, for authentication, and for exchange or agreement of the cryptographic keys.

According to various embodiments, the VPN gateway sends the VPN gateway's identity (which may be a local address), cipher settings, and VPN gateway random information to the client 301. In typical implementations, the address the client uses to initiate the VPN tunnel is a physical IP address associated with the VPN gateway. However, if the physical address is provided and used to establish the VPN tunnel using IKE, the client would only be able to communicate with the VPN gateway and not any other VPN gateway with a different physical address, even if the other VPN gateway provides access to the same private network. If the client detects failure of the VPN gateway, the client would have to be reconfigured to contact another VPN gateway to establish a new VPN tunnel.

The techniques of the present invention recognize that failover can be made more efficient by having the VPN gateway provide a virtual IP address to the client. Multiple VPN gateways can be configured to share the same virtual IP address. The VPN gateways can also be configured to send its virtual address in a digital certificate instead of sending a physical address in the digital certificate. The digital certificate could then be used for communication with any VPN gateway in a peer group of VPN gateways with the included IP address used to validate the original identity sent earlier in the tunnel establishment process.

Any set of multiple VPN gateways configured to provide fault tolerance for access to a private network in the event that any one gateway fails is referred to herein as a peer group.

According to various embodiments, master secret information is not transmitted over the network during a handshake phase but is instead derived independently by both a client entity and a VPN gateway entity. If the VPN gateway requested client authentication, the client signs a piece of data that is unique to this handshake and known by both the client and VPN gateway and sends both the signed information and the client's own certificate to the VPN gateway. According to various embodiments, the client signs a piece of data unique to the handshake by performing a hash and encrypting this result with its private key.

Figure 4:
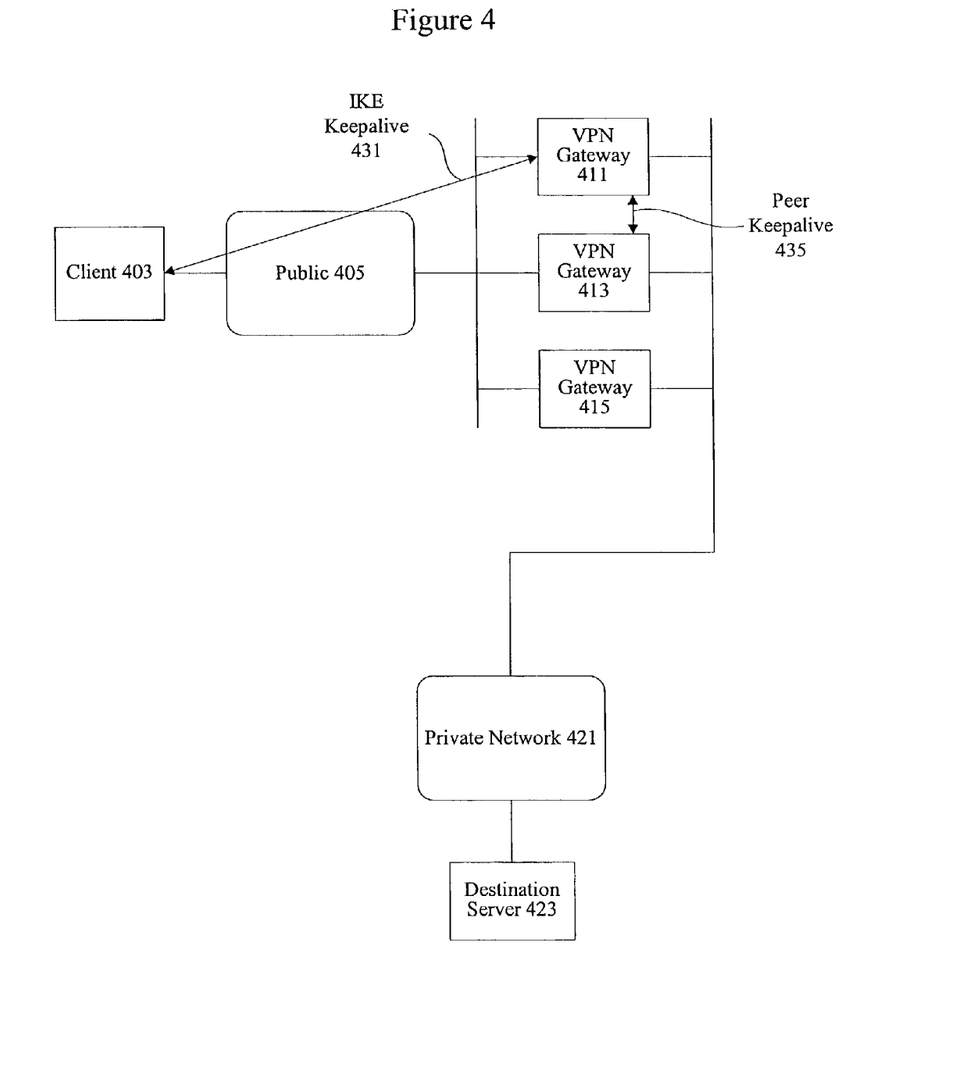
FIG. 4 is a diagrammatic representation depicting a redundant VPN gateway architecture.

FIG. 4 is a diagrammatic representation showing one implementation of redundant VPN gateways. In typical implementations, keepalive messages 431 are sent between a client 403 and a VPN gateway 411 client is communicating with. If a keepalive signal 431 is not received from a gateway 411, a client often performs inefficient processing to determine that the VPN gateway 411 is no longer active. In some cases, the client waits until three keepalive signals are not received. The client 403 then begins to initialize a connection with another VPN gateway 413 on its gateway list. In other typical implementations, a VPN tunnel is not reestablished until IPsec or IKE security associations are rekeyed. This typically does not occur for extended periods of time, according to the lifetime of the IPsec security associations.

According to various embodiments of the present invention, a client 403 is configured with a gateway list including a virtual IP address shared by VPN gateways 411, 413, and 415. Instead of a gateway list that includes three different IP addresses, the techniques of the present invention allow a client 403 to access a destination server 423 on a private network 421 by using a single VPN gateway address. VPN gateways 411, 413, and 415 are configured with the virtual IP address. In one embodiment, the local address field associated with each of the VPN gateways is set as the virtual IP address instead of as the physical address of each of the respective gateways. The VPN gateways 411, 413, and 415 send messages such as keepalive messages 435 to each other to determine that an active gateway remains active. In other embodiments, the VPN gateways 411, 413, and 415 run HSRP to maintain status information. HSRP is described in RFC 2281 titled the Hot Standby Router Protocol, the entirety of which is incorporated by reference for all purposes.

In one example, VPN gateway 411 is the primary gateway in the peer group. When the VPN gateways in the peer group are initialized, VPN gateway 411 assumes the role of active gateway. The other gateways 413 and 415 are configurable as secondary and tertiary gateways and remain in a standby state until the keepalive signals or HSRP indicate that the VPN gateway 411 has gone down.

VPN gateways 413 and 415 may be stateless or stateful backups of VPN gateway 411. In the stateless case, no security association information is maintained by VPN gateways 413 and 415. This simplifies the implementation of redundant gateways. When a secondary VPN gateway 413 recognizes from signal such as keepalive signal 435 that VPN gateway 411 is no longer active, the VPN gateway 413 assumes the role of active gateway and signals the client 403 to initialize a new secured session. According to various embodiments, the VPN gateways 411, 413, and 415 use HSRP to determine the availability of resources associated with each gateway. In one event, a failure of a hardware accelerator card may slow down cryptographic operations but would not stop a VPN gateway from sending keepalive signals to a client. However, HSRP would detect the failure and initiate a failover. According to various embodiments, the techniques of the present invention can be combined with IPsec to facilitate failure detection and failover initiation. By using an existing protocol such as HSRP, a secondary VPN gateway can more quickly become aware of failure in a primary device.

It should be noted that although one VPN gateway herein is referred to as primary and the other is referred to a secondary, the VPN gateways may be identical in many respects and may have roles swapped depending on session. By using a redundancy protocol such as HSRP, a more complete picture of gateway availability is provided.

In the stateful case, security association information may be maintained between the different VPN gateways. When a secured session between a client 403 and a VPN gateway 411 is no longer operable, a VPN gateway 403 can assume the role of VPN gateway 411 since it has security association information available to it. Furthermore, the VPN tunnel does not have to be renegotiated, which reduces traffic loss.

In both the stateless and the stateful case, the client 403 is able to continue communicating with a private network relatively unaware that any VPN gateway failover has occurred. In the stateless case, there may be some delay in connectivity as security association information is exchanged with VPN gateway 413 and routes are updated in the private network. In the stateful case, the security association information is already maintained in the redundant systems and the failover more seamless from the point of view of the client 403.

Figure 5:
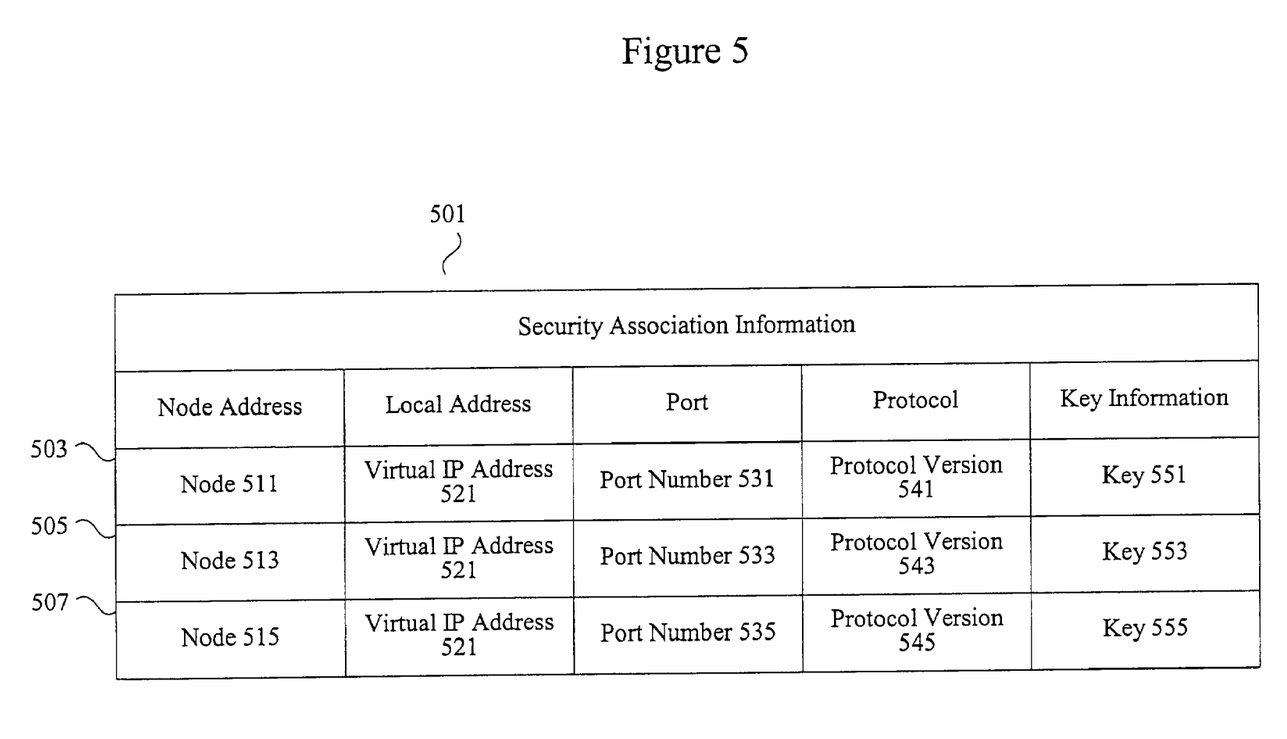
FIG. 5 is a diagrammatic representation showing a security association database.

FIG. 5 is a diagrammatic representation of one simplified example of a security association database that can be used to implement the techniques of the present invention. Security association information table 501 includes entries for identifying information associated with external nodes 511, 513, and 515. According to various embodiments, security association information includes a local address set as a virtual IP address shared by the VPN gateways in the peer group. In typical implementations, the local address would be the physical IP address of the gateway. According to various embodiments of the present invention, the local address is a virtual IP address shared by the VPN gateways. The security association information also includes port number 531, 533, and 535 associated with entries 503, 505, and 507. In some implementations, protocol and key information is also maintained. Protocols along with their version numbers are maintained in fields 541, 543 and 545. Table 501 can also include key information or references to key information associated with a particular session with external nodes.

Figure 6:
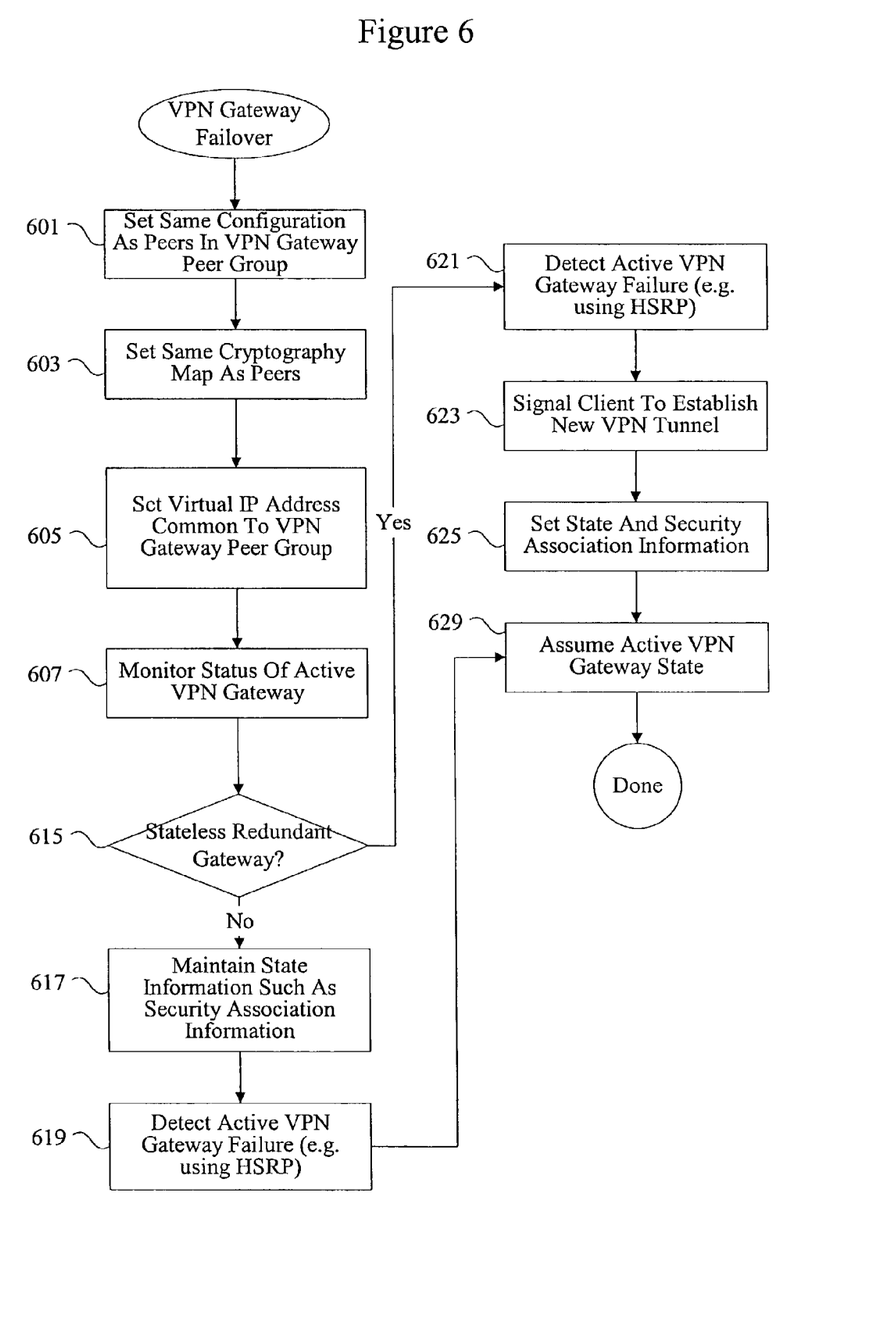
FIG. 6 is a process flow diagram showing a technique VPN gateway failover.

FIG. 6 is a flow process diagram showing one example of a VPN gateway failover. At 601, a redundant gateway is set with the same configuration as its peers in the VPN gateway peer group. At 603, the redundant gateway is set with the same cryptography map as the VPN gateways in the peer group. At 605, the redundant gateway is set with the same virtual IP address as the other gateways in the peer group. According to various embodiments, the virtual IP address is the local address provided by an active gateway to a client during a key exchange sequence. At 607, the redundant gateway monitors the status of the active VPN gateway using mechanisms available in HSRP. If the redundant gateway is being run statelessly, the redundant gateway would detect a failure of the active VPN gateway at 621 typically using mechanisms such as HSRP. At 623, the redundant gateway signals the client to establish a new VPN tunnel. The state and security association information would then be set at 625 after communicating with the client.

At 629, the redundant gateway assumes a fully active VPN gateway state. If the redundant gateway is stateful, the redundant gateway continues maintaining state information such as security association information and 617. After detecting failure of the active VPN gateway, the redundant gateway assumes the active VPN gateway state since it already has state information. According to various embodiments, the primary and secondary VPN gateways are configured with the same HSRP priority. By having the gateways running with the same HSRP priority, a primary gateway that fails will not take over operations as soon as it reinitiates. Instead, the secondary gateway will continue to operate.

The techniques of the present invention provide that a virtual IP address is configured for the public network side of the VPN gateway peer group. By using a virtual IP address, clients on a public network communicating with the VPN gateway see a single address and would use the single address to communicate with a private network through the VPN gateway peer group. However, the techniques of the present invention allow a virtual IP address to be used on the private network interface side of the VPN gateways in the peer group as well as on the public network interface side. Network entities on the private network side would also see a single virtual IP address. In this instance, network entities in both the public and private network would be relatively unaware that more than one gateway even exists in the VPN gateway peer group.

According to various embodiments, certain cryptographic operations performed by a primary gateway on traffic received from a public network client destined for an entity on the private network should be processed by the same primary gateway when the entity on the private network responds to the public network client. To provide that outbound traffic is processed by the same gateway used to process inbound traffic, reverse route injection is used to create routes in a private network. As will be appreciated by one of skill in the art, reverse route injection is used to generate routes using an available link state based such as the available Open Shortest Path First (OSPF) or Enhanced Interior Gateway Routing Protocol (EIGRP).

According to various embodiments, the techniques of the present invention provide that reverse route injection be used particularly in the stateful redundancy situation. By using reverse route injection, a message from a client on a public network that reaches an entity on a private network through a primary gateway that has since failed can have a response travel through a secondary gateway after a reverse route is injected into the private network.

Figure 7:
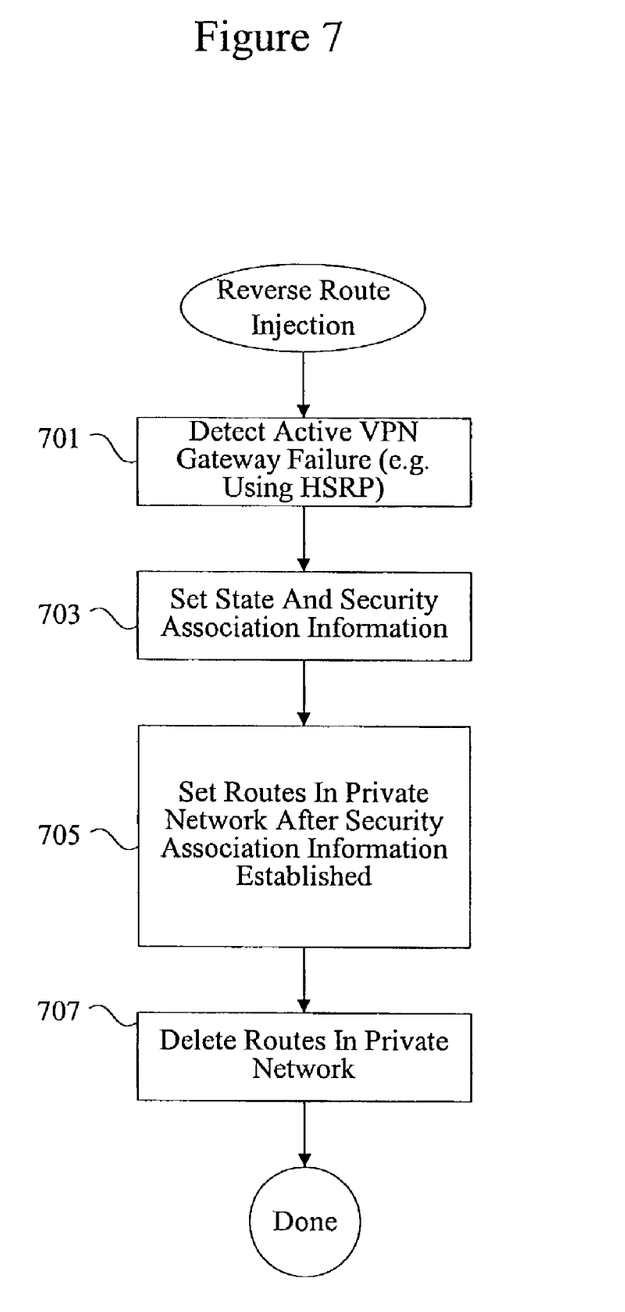
FIG. 7 is a process flow diagram showing a technique for reverse route injection.

FIG. 7 is a flow process diagram showing reverse route injection. At 701, it is determined that it in active device has failed, using mechanisms such as HSRP. At 711, routes are deleted on the failed device. At 703 security association information is determined. In the stateful case, security association information is maintained during normal operation. In the stateless case, security association information is obtained from a client after an active VPN gateway fails. At 705, and reverse route is injected into the private network using mechanisms such as link state packets. In some examples, the routes are injected after the security association information is determined, but it should be noted that routes can be injected even before security association information is determined. In some cases, routes can be injected as soon as failover is detected.

A variety of link state protocols will be appreciated by one of skill in the art. By using reverse route injection, updates to the routing tables for the entities in the private network can be achieved more quickly and dynamically than if route failures had to be determined without the use of reverse route injection by using static routes on all upstream devices. At 707, routes are propagated into the private network using the virtual IP address or the physical IP address. If the physical IP address is used in the private network at 721, there may be convergence time and propagation delay as entities in the private network may at times have multiple routes. That is, entities may have routes using both the active VPN gateway and the failed VPN gateway because the physical address takes time to propagate through the private network.

According to various embodiments, the techniques of the present invention provide a VPN gateway with a virtual IP address on the public network side and physical IP addresses on the private network side. However, the techniques of the present invention recognize the benefits of providing a virtual IP address on the private network side as well as on the public network side. If the virtual IP address is used in the private network at 723, the propagation delay and convergence time on the private network can be zero. Propagating routes using the virtual IP address, initially and/or after failover, allows entities in the private network to see the same address regardless of any failover. According to various embodiments, using the virtual IP address allows redundancy at the VPN gateway to be completely transparent to the entities in the private network.

Although the techniques of the present invention have been discussed with reference to VPN, one of skill in the art will appreciate that the techniques can be used with a variety of different architectures including variants to VPN. Different encryption algorithms can also be used to provide security for the VPN tunnel. The techniques of the present invention can also be implemented on a variety of devices, such as gateways, routers, servers, switches coupling a private network with a public network. Such devices typically include processors, memory, and public and private network interfaces. In some implementations, the public and private network interface may be the same interface.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. Therefore, the scope of the invention should be determined with reference to the appended claims.

What is claimed is:

1. A method for providing redundancy at a virtual private network gateway, the method comprising:

identifying one of a plurality of VPN gateways as a primary VPN gateway and another as a secondary VPN gateway, the plurality of VPN gateways coupling a private network to a public network, wherein the plurality of VPN gateways have a plurality of distinct actual IP addresses;

setting the primary VPN gateway as the active VPN gateway;

assigning a virtual IP address to the plurality of VPN gateways, wherein the plurality of VPN gateways are configured to share the same virtual IP address, wherein a client associated with the public network communicates with an entity on the private network by using the assigned virtual IP address;

using the virtual IP address during a key exchange sequence with the client associated with the public network before allowing a client associated with the public network to access an entity on the private network;

determining that the primary VPN gateway has failed;

setting the secondary VPN gateway as the active VPN gateway, wherein the secondary VPN gateway continues serving VPN tunnels established by the primary VPN gateway without renegotiating IPsec sessions; and injecting a reverse route into the private network using a plurality of link state packets, the plurality of link state packets including the virtual IP address.

2. The method of claim 1, wherein the plurality of VPN gateways run the Hot Standby Router Protocol.

3. The method of claim 1, wherein the plurality of VPN gateways run the Virtual Router Redundancy Protocol.

4. The method of claim 3, wherein virtual IP address is used during an IKE sequence.

5. The method of claim 1, wherein the virtual IP address instead of the physical IP address of the primary VPN gateway is used during the key exchange sequence.

6. The method of claim 1, further comprising setting a secondary VPN gateway as the active VPN gateway.

7. The method of claim 6, further comprising explicitly advertising routes to the private network after the secondary VPN gateway becomes active.

8. The method of claim 7, wherein the primary VPN gateway does not preempt the secondary VPN gateway even after the primary VPN gateway becomes available.

9. The method of claim 8, wherein the primary VPN gateway and the secondary VPN gateway have the same HSRP priority.

10. A first VPN gateway, comprising:
memory;
a processor;
a data structure stored in the memory, the data structure maintaining security association information from an active second VPN gateway while the first VPN gateway operates as a standby VPN gateway, wherein the first VPN gateway continues serving VPN tunnels established by the second VPN gateway without renegotiating IPsec sessions when the first VPN gateway becomes the active VPN gateway;
a public network interface coupled to the processor, the public network interface configured to provide a virtual IP address to a client associated with a public network during a key exchange sequence, wherein the virtual IP address is assigned to a plurality of VPN gateways coupling a private network to the public network, wherein a virtual IP address is assigned to the plurality of VPN gateways, wherein the plurality of VPN gateways are configured to share the same virtual IP address, wherein a client associated with the public network communicates with an entity on the private network by using the assigned virtual IP address; and
a private network interface configured to provide the virtual IP address to an entity associated with the private network, wherein the private network interface is configured to provide the virtual IP address in a plurality of link state packets during reverse route injection, wherein reverse route injection comprises injecting a reverse route into the private network using a plurality of link state packets, the plurality of link state packets including the virtual IP address.

11. The VPN gateway of claim 10, wherein the plurality of VPN gateways run the Hot Standby Router Protocol.

12. The VPN gateway of claim 10, wherein the plurality of VPN gateways run the Virtual Router Redundancy Protocol.

13. The VPN gateway of claim 12, wherein virtual IP address is used during an IKE sequence.

14. The VPN gateway of claim 10, wherein the virtual IP address instead of the physical IP address of the VPN gateway is used during the key exchange sequence.

15. The VPN gateway of claim 14, wherein the private network interface is configured to explicitly advertise routes to the private network using the virtual IP address.

16. A VPN gateway peer group, comprising:
means for identifying one of a plurality of VPN gateways as a primary VPN gateway and another as a secondary VPN gateway, the plurality of VPN gateways coupling a private network to a public network;
means for setting the primary VPN gateway as the active VPN gateway;
means for assigning a virtual IP address to the plurality of VPN gateways, wherein a client associated with the public network communicates with an entity on the private network by using the assigned virtual IP address;
means for using the virtual IP address during a key exchange sequence with the client associated with the public network before allowing a client associated with the public network to access an entity on the private network;
means for determining that the primary VPN gateway has failed;
means for setting the secondary VPN gateway as the active VPN gateway, wherein the secondary VPN gateway continues serving VPN tunnels established by the primary VPN gateway without renegotiating IPsec sessions; and
means for injecting a reverse route into the private network using a plurality of link state packets, the plurality of link state packets including the virtual IP address.

17. The VPN gateway peer group of claim 16, wherein the plurality of VPN gateways run the Hot Standby Router Protocol.

18. The VPN gateway peer group of claim 16, further comprising explicitly advertising routes to the private network after the secondary VPN gateway becomes active.

19. The VPN gateway peer group of claim 18, wherein routes are explicitly advertised using the virtual IP address.

20. The VPN gateway peer group of claim 18, wherein the primary VPN gateway does not preempt the secondary VPN gateway even after the primary VPN gateway becomes available.

21. The VPN gateway peer group of claim 20, wherein the primary VPN gateway and the secondary VPN gateway have the same HSRP priority.

22. A computer readable medium comprising computer code embodied therein for configuring a VPN gateway peer group, the computer readable medium comprising:
computer code for identifying one of a plurality of VPN gateways as a primary VPN gateway and another as a secondary VPN gateway, the plurality of VPN gateways coupling a private network to a public network;
computer code for setting the primary VPN gateway as the active VPN gateway;
computer code for assigning a virtual IP address to the plurality of VPN gateways, wherein a client associated with the public network communicates with an entity on the private network by using the assigned virtual IP address;

computer code for using the virtual IP address during a key exchange sequence with the client associated with the public network before allowing a client associated with the public network to access an entity on the private network;

computer code determining that the primary VPN gateway has failed;

computer code for setting the secondary VPN gateway as the active VPN gateway, wherein the secondary VPN gateway continues serving VPN tunnels established by the primary VPN gateway without renegotiating IPsec sessions; and computer code injecting a reverse route into the private network using a plurality of link state packets, the plurality of link state packets including the virtual IP address.

23. The computer readable medium of claim 22, wherein the plurality of VPN gateways run the Hot Standby Router Protocol.

24. The computer readable medium of claim 22, further comprising explicitly advertising routes to the private network after the secondary VPN gateway becomes active.

25. The computer readable medium of claim 24, wherein routes are explicitly advertised using the virtual IP address.

26. The computer readable medium of claim 24, wherein the primary VPN gateway does not preempt the secondary VPN gateway even after the primary VPN gateway becomes available.

27. The computer readable medium of claim 26, wherein the primary VPN gateway and the secondary VPN gateway have the same HSRP priority.

* * * * *